(12) United States Patent
Ko et al.

(10) Patent No.: US 10,674,461 B2
(45) Date of Patent: *Jun. 2, 2020

(54) METHOD FOR TRANSMITTING SYNCHRONIZATION SIGNAL AND DEVICE THEREFOR

(71) Applicant: LG Electronics Inc., Seoul (KR)

(72) Inventors: Hyunsoo Ko, Seoul (KR); Kijun Kim, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,907

(22) Filed: Aug. 8, 2019

(65) Prior Publication Data
US 2019/0364529 A1    Nov. 28, 2019

Related U.S. Application Data

(63) Continuation of application No. 16/065,058, filed as application No. PCT/KR2017/012594 on Nov. 8, 2017.

(Continued)

(51) Int. Cl.
*H04W 72/04* (2009.01)
*H04W 56/00* (2009.01)
(Continued)

(52) U.S. Cl.
CPC ..... *H04W 56/0005* (2013.01); *H04J 11/0073* (2013.01); *H04J 11/0076* (2013.01);
(Continued)

(58) Field of Classification Search
CPC .................................................. H04W 56/00
See application file for complete search history.

(56) References Cited

U.S. PATENT DOCUMENTS

2015/0181543 A1    6/2015  Hwang et al.
2016/0088621 A1    3/2016  Lee et al.
(Continued)

FOREIGN PATENT DOCUMENTS

KR        101083795       11/2011
KR     1020130032548       4/2013
(Continued)

OTHER PUBLICATIONS

LG Electronics, "Synchronization signal design for NB-IoT," R1-161968, 3GPP TSG RAN WG1 NB-IoT Ad-Hoc Meeting, Sophia Antipolis, France, Mar. 22-24, 2016, 7 pages.

(Continued)

*Primary Examiner* — Sulaiman Nooristany
(74) *Attorney, Agent, or Firm* — Fish & Richardson P.C.

(57) ABSTRACT

A method for transmitting a synchronization signal block by a base station in a wireless communication system. Particularly, the method includes: mapping a plurality of synchronization signal blocks onto a plurality of symbols within a predetermined time unit; and transmitting, to a terminal, the plurality of synchronization signal blocks mapped onto the plurality of symbols, wherein at least one synchronization signal block is mapped onto each one-half time unit which has half the length of the predetermined time unit.

15 Claims, 11 Drawing Sheets

Related U.S. Application Data

(60) Provisional application No. 62/419,477, filed on Nov. 9, 2016.

(51) Int. Cl.
*H04J 11/00* (2006.01)
*H04L 5/00* (2006.01)

(52) U.S. Cl.
CPC .......... *H04L 5/0048* (2013.01); *H04L 5/0058* (2013.01); *H04W 72/04* (2013.01)

(56) References Cited

U.S. PATENT DOCUMENTS

2017/0006578 A1* 1/2017 Rico Alvarino ...... H04L 5/0048
2017/0294999 A1 10/2017 Patel et al.

FOREIGN PATENT DOCUMENTS

| | | |
|---|---|---|
| KR | 1020140132344 | 11/2014 |
| KR | 1020140142706 | 12/2014 |
| KR | 1020150101954 | 9/2015 |
| KR | 1020150112942 | 10/2015 |
| KR | 1020160064080 | 6/2016 |
| KR | 1020160128401 | 11/2016 |
| WO | WO2016148530 | 9/2016 |

OTHER PUBLICATIONS

LG Electronics, "Discussion on synchronization signal design," R1-143189, 3GPP TSG RAN WG1 Meeting #78, Dresden, Germany, Aug. 18-22, 2014, 5 pages.

ZTE, et al., "Considerations on SS burst design", 3GPP TSG RAN WG1 Meeting #87, R1-1611269, Nov. 2016, 5 pages.

NTT Docomo, "Discussion and evaluation on NR-PSS/SSS design", 3GPP TSG RAN WG1 Meeting #87, R1-1612721, Nov. 2016, 10 pages.

Huawei, et al., "Unified single/multiple beam operations for initial access", 3GPP TSG RAN WG1 Meeting #87, R1-1611667, Nov. 2016, 10 pages.

Samsung, "Initial access signal mapping and multiplexing for sub6GHz", 3GPP TSG RAN WG1 Meeting #87, R1-1612455, Nov. 2016, 5 pages.

PCT International Application No. PCT/KR2017/012594, Written Opinion of the International Searching Authority dated Mar. 12, 2018, 9 pages.

NEC, "Discussion on NR synchronization signal and essential system information mapping", 3GPP TSG RAN WG1 Meeting #86bis, R1-1609147, Oct. 2016, 2 pages.

Samsung, "Discussion on TTI, subframe and signalling timing for NR", 3GPP TSG RAN WG1 Meeting #85, R1-164004, May 2016, 5 pages.

Qualcomm Incorporated, "Multi-beam SYNC design," R1-1612024, 3GPP TSG RAN WG1 Meeting #87, Reno, Nevada, USA, Nov. 14-18, 2016, 10 pages.

Qualcomm Incorporated, "Single beam PBCH design considerations," R1-1610157, 3GPP TSG-RAN WG1 #86b, Lisbon, Portugal, Sep. 10-14, 2016, 3 pages.

United States Office Action in U.S. Appl. No. 16/065,058, dated Aug. 29, 2019, 9 pages.

* cited by examiner

FIG. 2
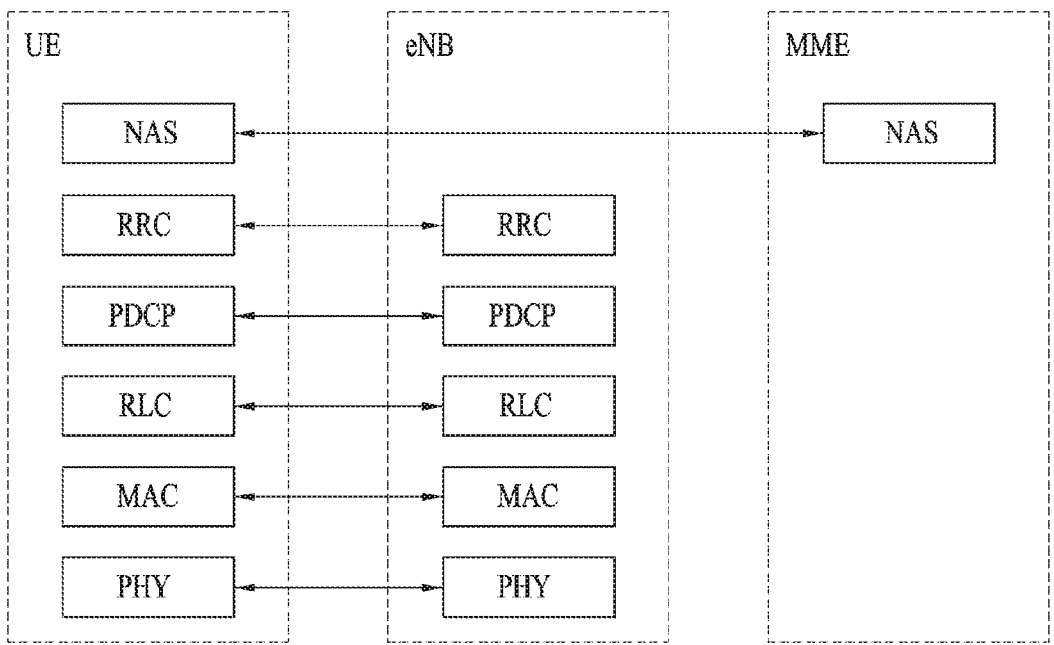
(A) CONTROL-PLANE PROTOCOL STACK
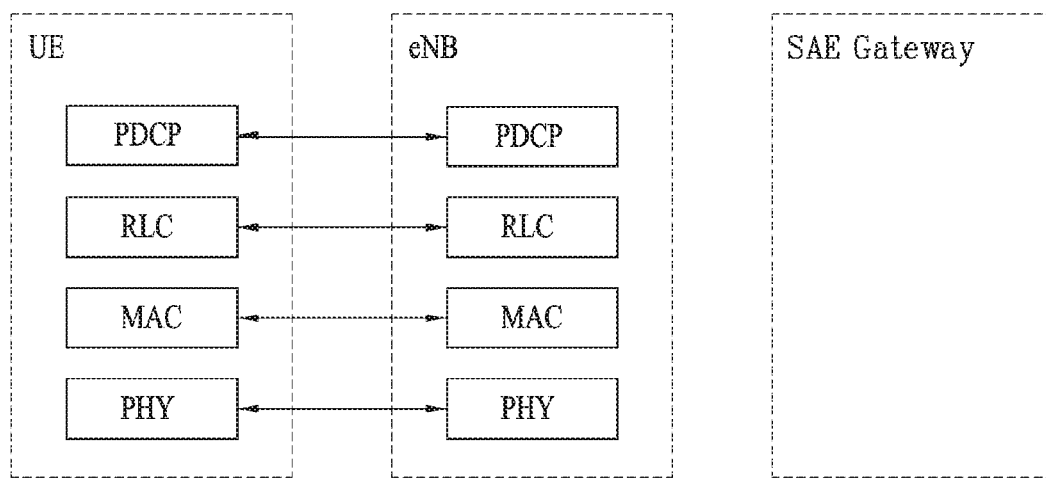
(B) USER-PLANE PROTOCOL STACK

METHOD FOR TRANSMITTING SYNCHRONIZATION SIGNAL AND DEVICE THEREFOR

CROSS-REFERENCE TO RELATED APPLICATIONS

This application is a continuation application of U.S. application Ser. No. 16/065,058, filed on Jun. 21, 2018, which claims benefit of International Application No. PCT/KR2017/012594, filed on Nov. 8, 2017, which claims the benefit of U.S. Provisional Application No. 62/419,477, filed on Nov. 9, 2016. The disclosures of the prior applications are incorporated by reference in their entirety.

TECHNICAL FIELD

The present invention relates to a method of transmitting a synchronization signal in a wireless communication system and an apparatus therefor, and more particularly, to a method of transmitting a synchronization signal block including a PSS (primary synchronization signal), an SSS (secondary synchronization signal), and a PBCH (physical broadcast channel) and an apparatus therefor.

BACKGROUND

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

A technical task of the present invention is to provide a method of transmitting a synchronization signal in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a synchronization signal, which is transmitted by a base station in a wireless communication system includes the steps of mapping a plurality of synchronization signal blocks to a plurality of symbols in a specific time unit, and transmitting a plurality of the synchronization signal blocks mapped to a plurality of the symbols to a user equipment. In this case, at least one synchronization signal block can be mapped to each of half time units having a half-length of the specific time unit.

In this case, the synchronization signal block can be mapped in a manner of not being straddled over a boundary between the half time units in the specific time unit.

And, a plurality of the synchronization signal blocks may not be mapped to at least two symbols positioned at the very first of a plurality of the symbols.

And, a plurality of the synchronization signal blocks may not be mapped to at least two symbols positioned at the very last of a plurality of the symbols.

And, each of a plurality of the synchronization signal blocks can be mapped to 4 contiguous symbols.

And, an arrangement of a plurality of the synchronization signal blocks can be determined with a period of the specific time unit to repeatedly apply the same arrangement pattern in every specific time unit.

And, the specific time unit is distinguished by 14*n symbols, the n corresponds to an integer, and the specific time unit can be determined according to a subcarrier space.

To further achieve these and other advantages and in accordance with the purpose of the present invention, according to a different embodiment, a base station transmitting a synchronization signal block in a wireless communication system includes an RF unit configured to transceive a radio signal with a user equipment, and a processor configured to map a plurality of synchronization signal blocks to a plurality of symbols in a specific time unit in a manner of being connected with the RF unit, the processor configured to transmit a plurality of the synchronization signal blocks mapped to a plurality of the symbols to the user equipment. In this case, at least one synchronization signal block can be mapped to each of half time units having a half-length of the specific time unit.

In this case, the synchronization signal block can be mapped in a manner of not being straddled over a boundary between the half time units in the specific time unit.

And, a plurality of the synchronization signal blocks may not be mapped to at least two symbols positioned at the very first of a plurality of the symbols.

And, a plurality of the synchronization signal blocks may not be mapped to at least two symbols positioned at the very last of a plurality of the symbols.

And, each of a plurality of the synchronization signal blocks can be mapped to 4 contiguous symbols.

And, an arrangement of a plurality of the synchronization signal blocks can be determined with a period of the specific time unit to repeatedly apply the same arrangement pattern in every specific time unit.

And, the specific time unit is distinguished by 14*n symbols, the n corresponds to an integer, and the specific time unit can be determined according to a subcarrier space.

Advantageous Effects

According to the present invention, since it is able to efficiently transmit a synchronization signal block in a subframe, it is able to more efficiently perform initial access.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

FIG. 2 is a diagram for structures of control and user planes of radio interface protocol between a 3GPP radio access network standard-based user equipment and E-UTRAN;

DETAILED DESCRIPTION

Figure 1:
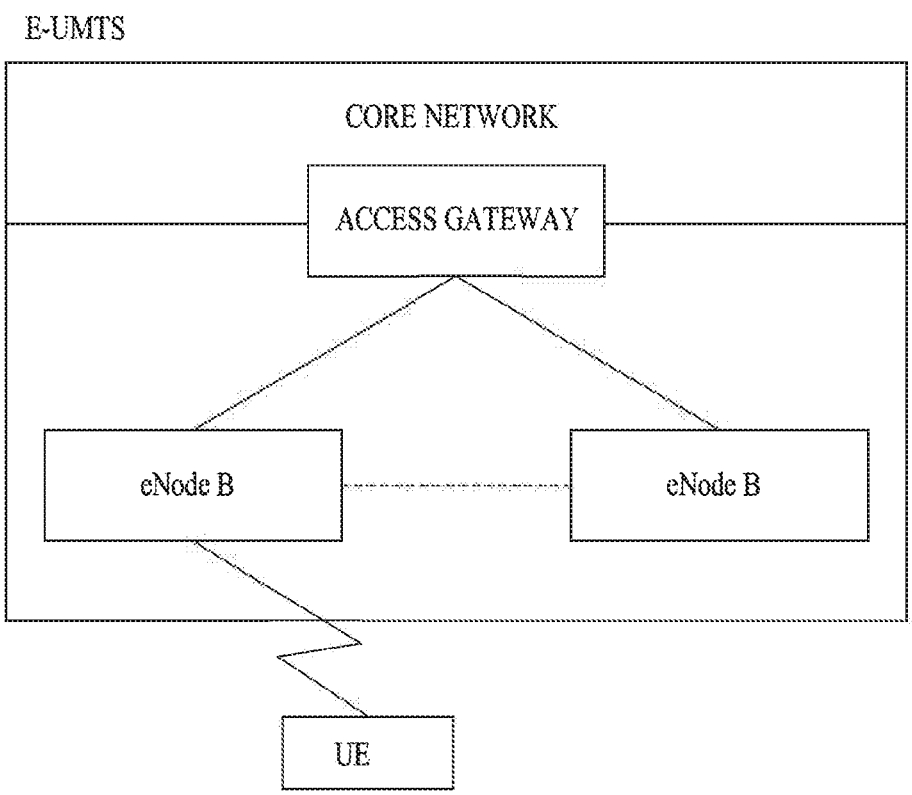
FIG. 1 is a schematic diagram of E-UMTS network structure as one example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
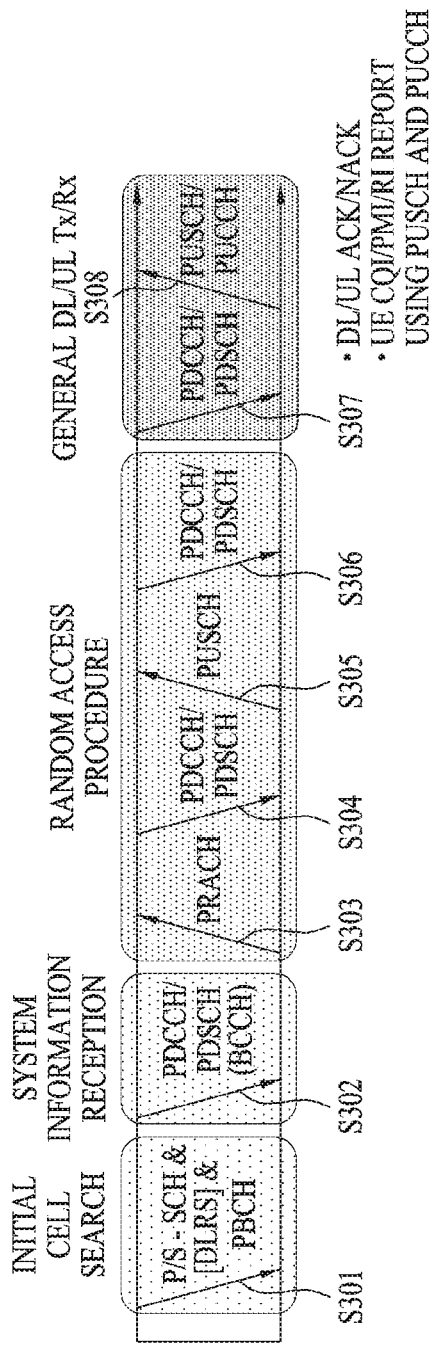
FIG. 3 is a diagram for explaining physical channels used for 3GPP system and a general signal transmission method using the physical channels.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
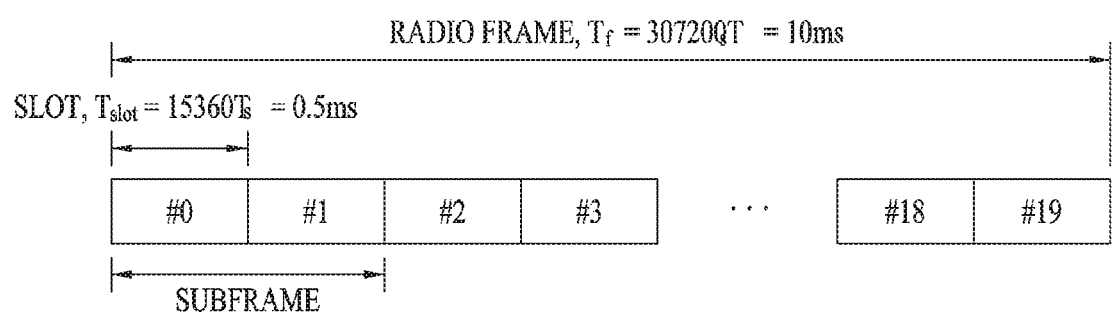
FIG. 4 is a diagram for a structure of a radio frame in LTE system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
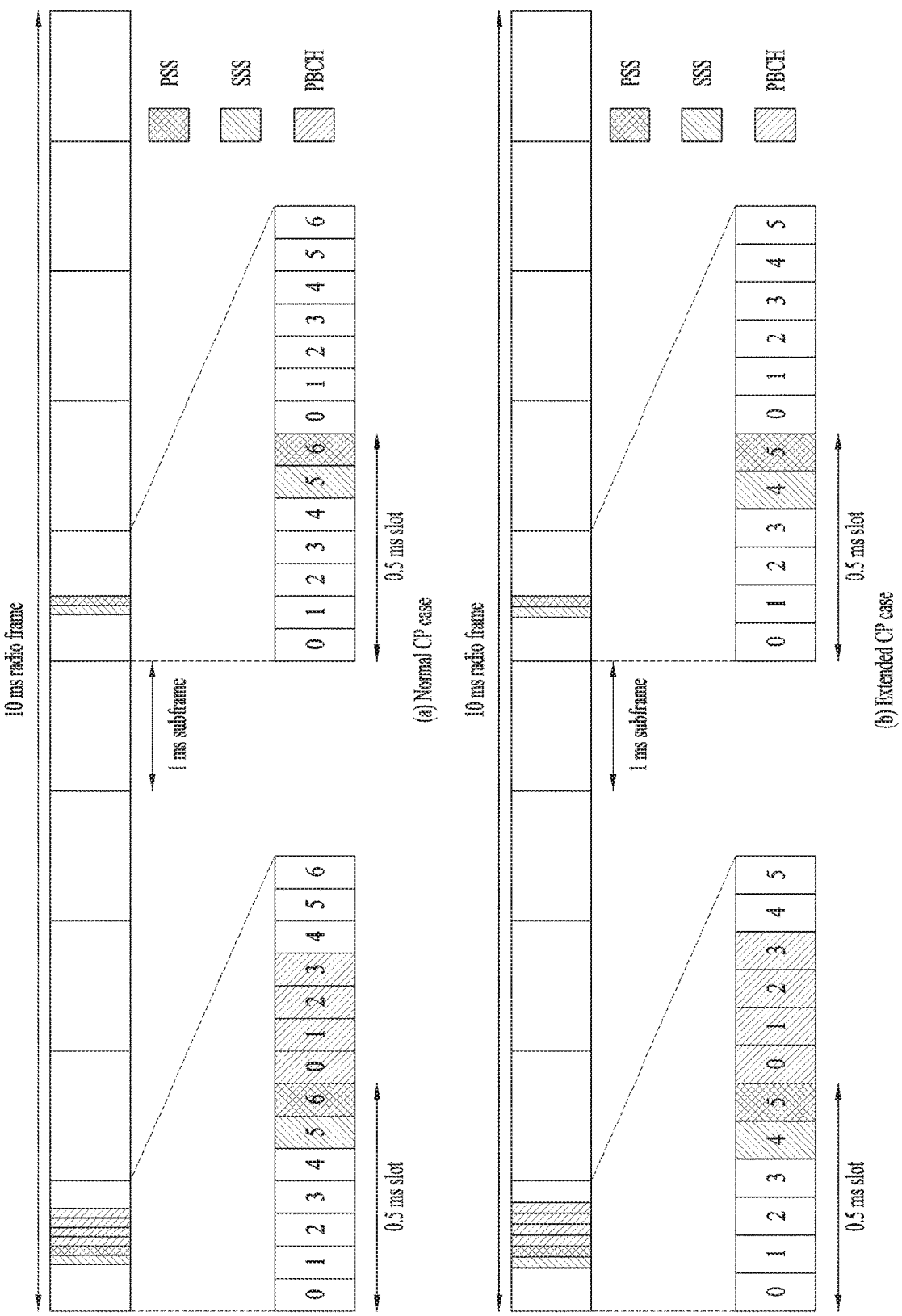
FIG. 5 is a diagram illustrating a radio frame structure for transmitting an SS (synchronization signal) in LTE system.

FIG. 5 is a diagram illustrating a radio frame structure for transmitting an SS (synchronization signal) in LTE system. In particular, FIG. 5 illustrates a radio frame structure for transmitting a synchronization signal and PBCH in FDD (frequency division duplex). FIG. 5 (a) shows positions at which the SS and the PBCH are transmitted in a radio frame configured by a normal CP (cyclic prefix) and FIG. 5 (b) shows positions at which the SS and the PBCH are transmitted in a radio frame configured by an extended CP.

An SS will be described in more detail with reference to FIG. 5. An SS is categorized into a PSS (primary synchronization signal) and an SSS (secondary synchronization signal). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 5, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 5, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In LTE/LTE-A system, subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 6:
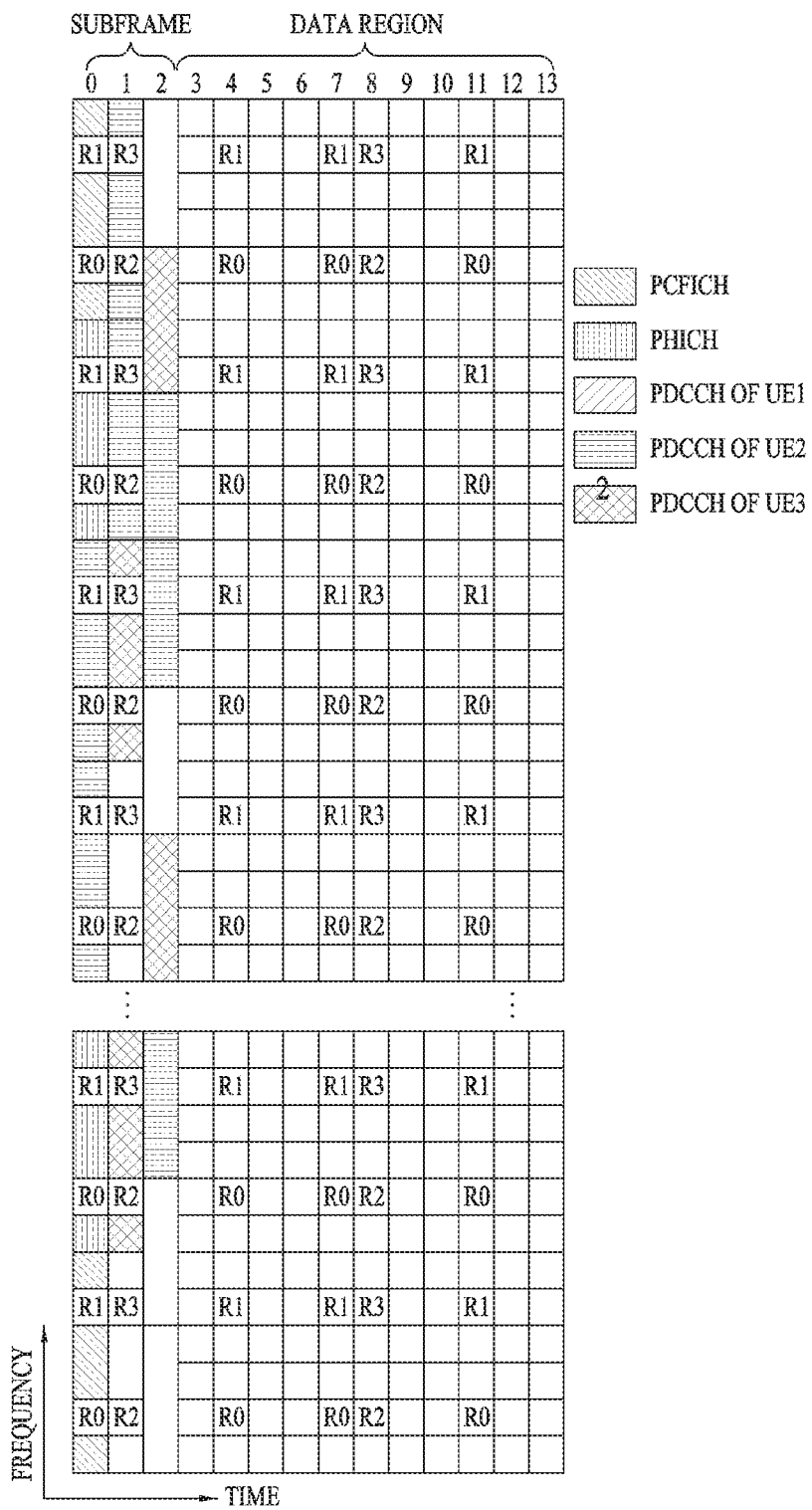
FIG. 6 illustrates a structure of a downlink radio frame in the LTE system.

FIG. 6 illustrates exemplary control channels included in a control region of a subframe in a DL radio frame.

Referring to FIG. 6, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 7:
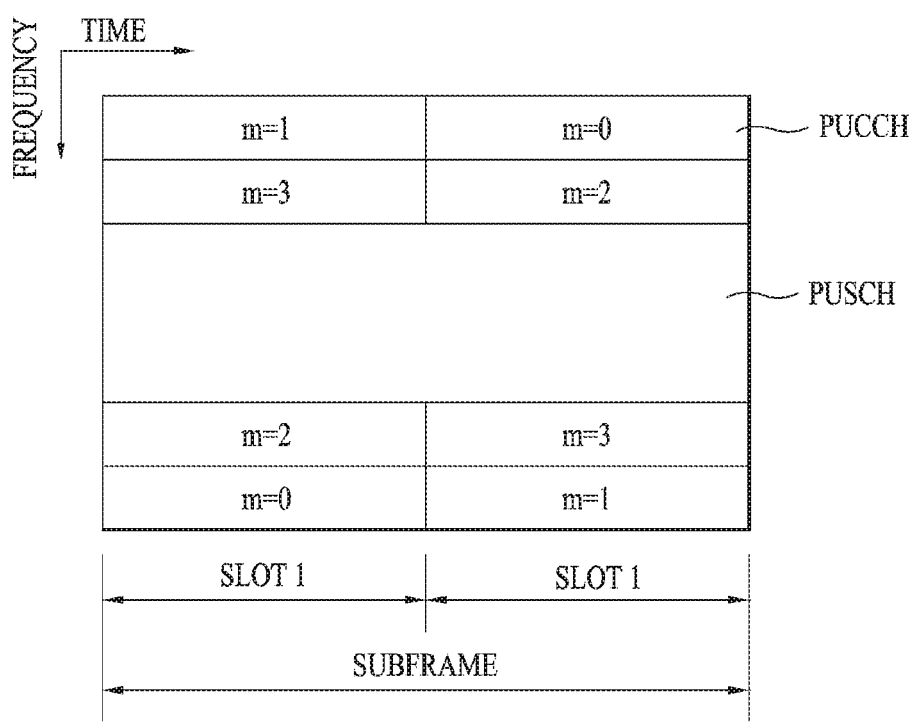
FIG. 7 illustrates a structure of an uplink subframe in the LTE system.

FIG. 7 illustrates a structure of a UL subframe in the LTE system.

Referring to FIG. 7, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 8:
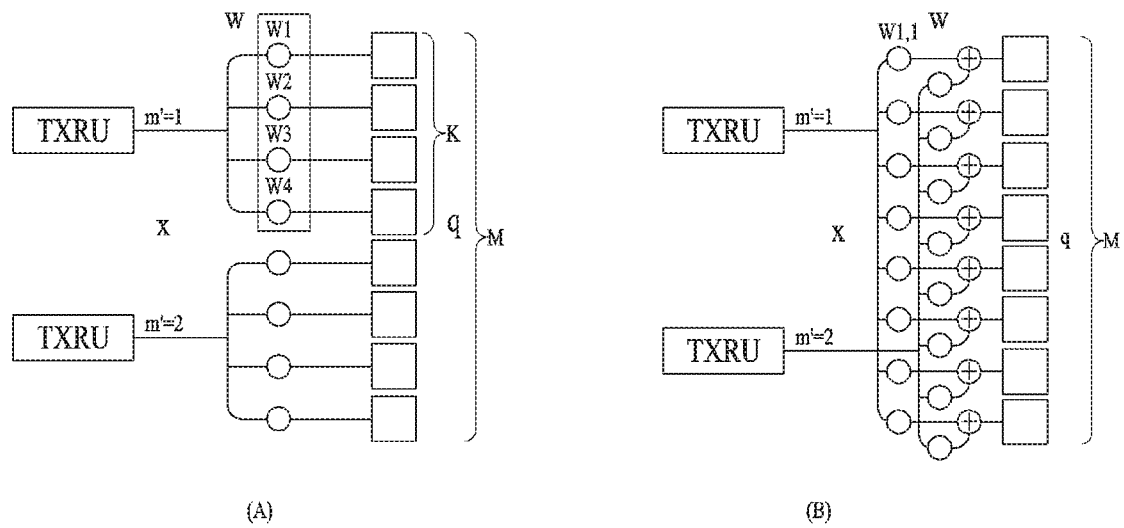
FIG. 8 illustrates examples of a connection scheme between TXRUs and antenna elements.

FIG. 8 illustrates examples of a connection scheme between TXRUs and antenna elements.

(a) of FIG. 8 illustrates that TXRU is connected to a sub-array. In this case, the antenna elements are connected to only one TXRU. Unlike (a) of FIG. 8, (b) of FIG. 8 illustrates that TXRU is connected to all antenna elements. In this case, the antenna elements are connected to all TXRUs. In FIG. 8, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 9:
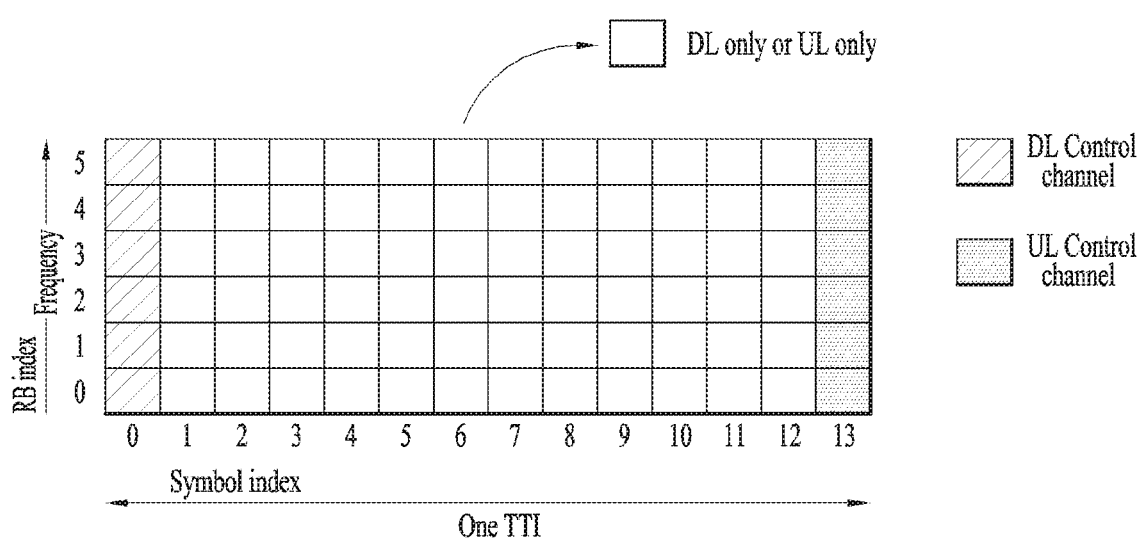
FIG. 9 illustrates an example of a self-contained subframe structure.

A self-contained subframe structure shown in FIG. 9 is considered in the fifth generation NewRAT to minimize data transmission latency in a TDD system. FIG. 9 illustrates an example of a self-contained subframe structure.

In FIG. 9, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period In the following, a method of configuring a synchronization signal is explained according to embodiments of the present invention. More specifically, a method of configuring a synchronization signal block (SS block), a synchronization signal burst (SS burst), and a synchronization signal burst set (SS burst set) is explained according to the embodiments of the present invention.

<Synchronization Signal Block; SS block>

In NewRAT, NR initial access signals and channels for performing an initial access procedure such as NR-SS (NewRAT Synchronization Signal), NR-PBCH (NewRAT Physical Broadcast Channel), control channel, MRS (measurement reference signal), and the like are defined.

As shown in Table 1 in the following, it may be able to define various types of a synchronization signal block according to a type of a signal and a channel included in a synchronization signal block.

TABLE 1

| SS Block | Channel/Signal |
| --- | --- |
| Type#1 | NR-SS |
| Type#2 | NR-SS and NR-PBCH |
| Type#3 | NR-SS and MRS |
| Type#4 | NR-SS, Control Channel |
| Type#5 | . . . |

In this case, each type of the synchronization signal block shown in Table 1 has the same time duration.

Figure 10:
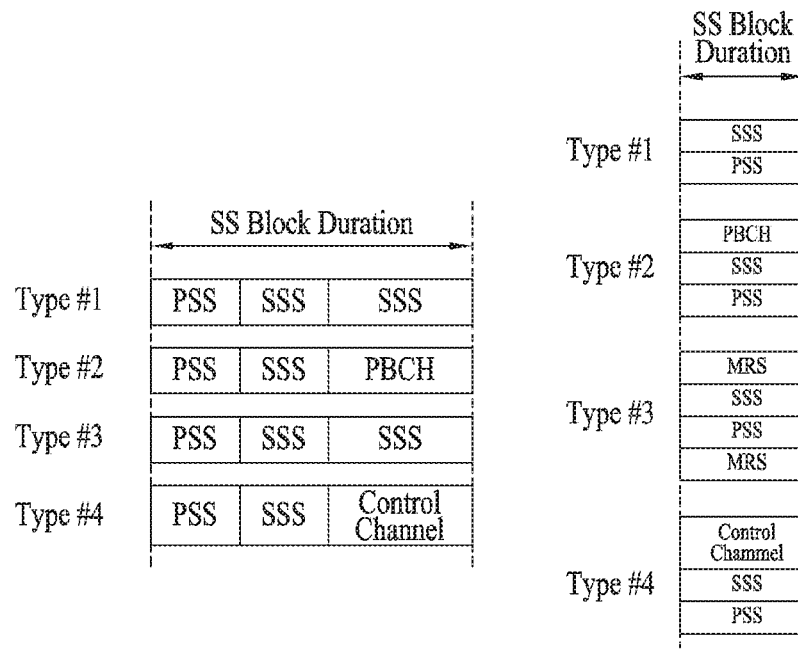
FIG. 10 is a diagram illustrating a configuration of a synchronization signal block according to an embodiment of the present invention.

FIG. 10 is a diagram illustrating each of types of a synchronization signal block having the same time duration. FIG. 10 illustrates configurations of a PSS, an SSS, a PBCH, an MRS, and a control channel according to each of types of a synchronization signal block.

Referring to FIG. 10, each of types of a synchronization signal block has the same time duration although a type is changed into a different type. As shown in the left of FIG.

10, a synchronization signal block can be multiplexed in time domain according to TDM (time division multiplexing) scheme. As shown in the right of FIG. 10, a synchronization signal block can be multiplexed in frequency domain according to FDM (frequency division multiplexing) scheme. And, each type of a synchronization signal block has the same numerology in the same time duration.

As shown in a type #1 and a type #3 of the left drawing of FIG. 10, if there is an empty section within a synchronization signal block, i.e., if there is a resource element to which PSS, SSS, PBCH, control channel, and MRS are not mapped, the resource element can be used for transmitting data.

<Configuration of Synchronization Signal Burst; SS Burst>

In NewRAT, it is defined as one or more synchronization signal blocks are to be included in a synchronization signal burst.

Figure 11:
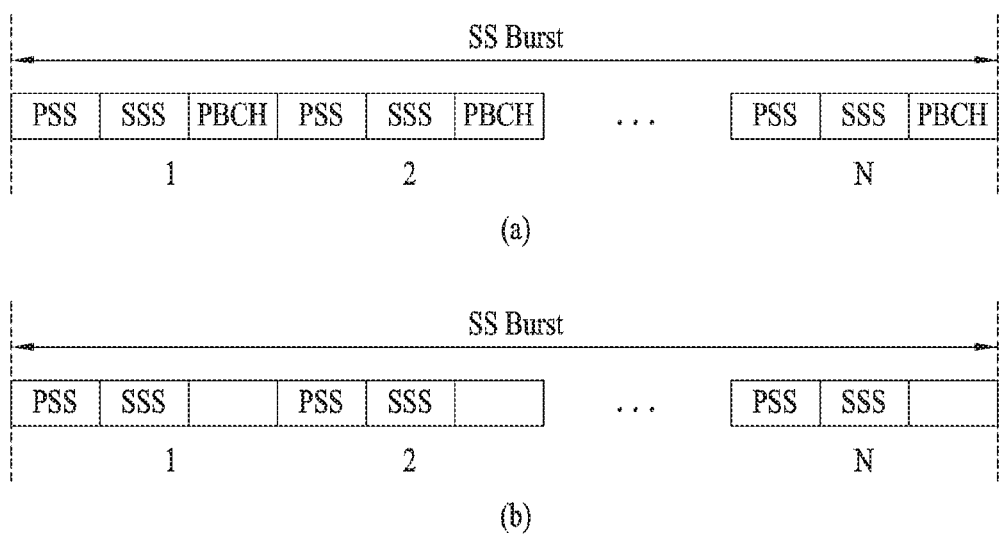
FIG. 11 is a diagram illustrating a configuration of a synchronization signal burst according to an embodiment of the present invention.

Specifically, as shown in FIG. 11, a synchronization signal burst is configured by synchronization signal blocks of the same type. In particular, one or more synchronization signal blocks are included in a synchronization signal burst. In this case, the one or more synchronization signal blocks included in the synchronization signal burst have the same type.

In particular, although synchronization signal blocks included in a synchronization signal burst shown in FIG. 11 (a) have a type different from a type of synchronization signal blocks included in a synchronization signal burst shown in FIG. 11 (b), each of a plurality of the synchronization signal blocks included in the synchronization signal burst of FIG. 11 (b) has the same type.

Since synchronization signal blocks of the same type are included in a synchronization signal burst, a type of the synchronization signal burst is determined according to the synchronization signal blocks included in the synchronization signal burst.

Meanwhile, as shown in FIGS. 11(a) and 11(b), synchronization signal blocks included in a synchronization signal burst can be sequentially numbered. Meanwhile, NR-PBCH can indicate an index of a synchronization signal burst.

Figure 12:
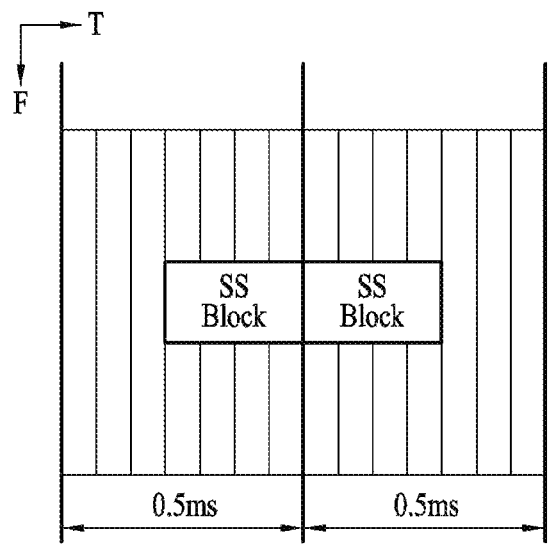
FIGS. 12 to 13 are diagrams for an embodiment of assigning a synchronization signal to a subframe.

In the following, a method of arranging synchronization signal blocks in a subframe is explained with reference to FIGS. 12 to 13.

In a self-contained subframe, a downlink control channel and a DMRS (demodulation reference signal) are mapped to one or more OFDM symbols positioned at the forepart of the self-contained subframe and an uplink control channel is mapped to one or more OFDM symbols positioned at the last part of the self-contained subframe.

Hence, a synchronization signal block can be mapped to a median area of the subframe to make the synchronization signal block avoid areas to which the downlink control channel and the uplink control channel are mapped. In particular, in order to make the area to which the synchronization signal block is mapped not to be overlapped with the areas to which the downlink control channel and the uplink control channel are mapped, it may be able to configure the synchronization signal block to be mapped to the median area of the self-contained subframe.

For example, if arrangement of a synchronization signal block is defined within 1 ms slot for 15 kHz subcarrier spacing, the synchronization signal block is not mapped between 2 slots adjacent to each other. In other word, as shown in FIG. 12, an NR synchronization signal block is arranged within every 0.5 ms in a subframe. And, the synchronization signal block is arranged in a manner of not straddling on a boundary between every 0.5 ms in a subframe. Specifically, as shown in FIG. 12, a synchronization signal block is arranged in a manner of not straddling between 0.5 ms of a first part of a subframe and 0.5 ms of a second part of the subframe (i.e., a middle line of the subframe).

In summary, if a subcarrier space corresponds to 15 kHz, a synchronization signal block is arranged to the center of a subframe and a synchronization signal block is arranged within a slot having a length of 0.5 ms. And, a synchronization signal block is arranged in a manner of not straddling on a middle line of a subframe, i.e., a boundary between every 0.5 ms of a subframe.

This is because, if a subcarrier space corresponds to 15 kHz and an FFT size corresponds to 2048, a length of a first OFDM symbol included in 0.5 ms is longer than a length of a different OFDM symbol as much as 16*Ts. In other word, this is because 2 extended CPs are used in an NR subframe of 1 ms. In particular, since a length of a first OFDM symbol included in 0.5 ms is longer than a length of a different OFDM symbol, if a synchronization signal block, which generates sequences to be mapped to 4 symbols on the basis of a normal CP, is mapped to a first OFDM symbol having a long CP length, it may be difficult to efficiently map and transmit the synchronization signal block.

Hence, it may be able to configure a synchronization signal block not to be mapped over a boundary between every 0.5 ms in a subframe on the basis of every 0.5 ms in a subframe.

Figure 13:
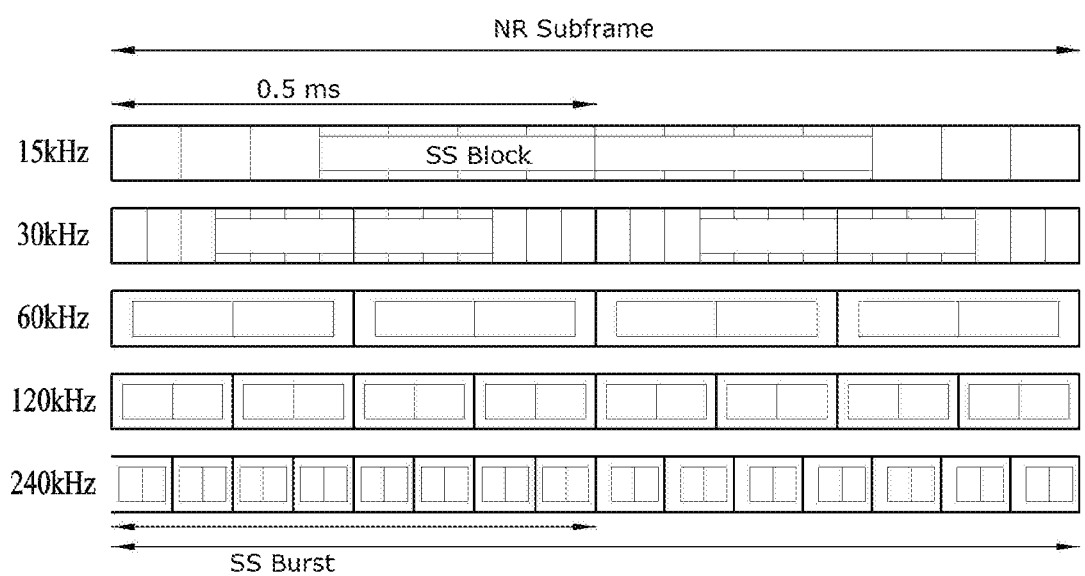

As shown in FIG. 13, the abovementioned rule of arranging a synchronization signal block can be applied to all subframes according to a subcarrier space. In particular, an NR synchronization signal burst can be defined within 0.5 ms or can be defined within an NR subframe irrespective of a subcarrier space.

In particular, a method of arranging a synchronization signal block mentioned earlier in FIGS. 12 and 13 may have a rule described in the following.

When a synchronization signal burst including multiple slots is considered, synchronization signal blocks are unable to be contiguous in the synchronization signal burst and are unable to be contiguous in the multiple slots as well.

Meanwhile, a period of an NR burst is determined based on an NR subframe irrespective of a subcarrier space.

<Synchronization Signal Burst Set; SS Burst Set>

Figure 14:
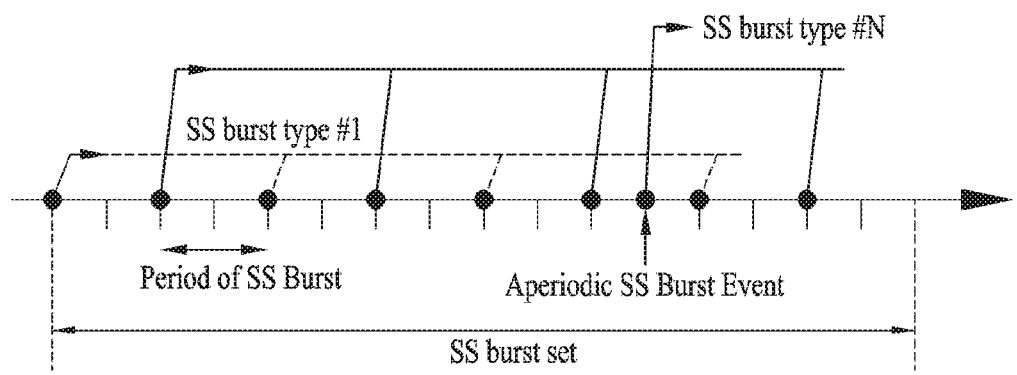
FIG. 14 is a diagram for explaining a configuration of a synchronization signal burst set.

FIG. 14 is a diagram for explaining a configuration of a synchronization signal burst set. Referring to FIG. 14, a synchronization signal burst set includes synchronization signal bursts of a different type. In the synchronization signal burst set, the synchronization signal bursts have the same period.

And, an aperiodic synchronization burst may occur in the synchronization signal burst set. In this case, the aperiodic synchronization burst may be the same with one of a plurality of synchronization signal bursts included in the synchronization signal burst set.

And, a periodic synchronization burst can be triggered in every period in the synchronization signal burst set. The period can be indicated by an indicator.

Figure 15:
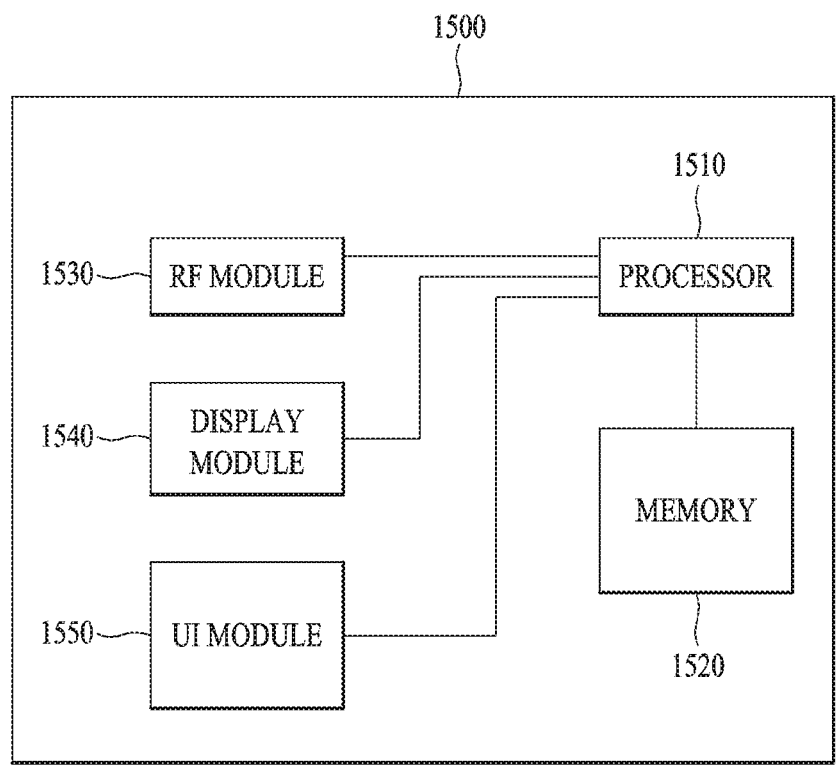
FIG. 15 is a block diagram of a communication apparatus according to an embodiment of the present disclosure.

Referring to FIG. 15, a communication apparatus 1500 includes a processor 1510, a memory 1520, an RF module 1530, a display module 1540, and a User Interface (UI) module 1550.

The communication device 1500 is shown as having the configuration illustrated in FIG. 15, for the convenience of description. Some modules may be added to or omitted from the communication apparatus 1500. In addition, a module of the communication apparatus 1500 may be divided into more modules. The processor 1510 is configured to perform operations according to the embodiments of the present disclosure described before with reference to the drawings. Specifically, for detailed operations of the processor 1510, the descriptions of FIGS. 1 to 14 may be referred to.

The memory 1520 is connected to the processor 1510 and stores an Operating System (OS), applications, program codes, data, etc. The RF module 1530, which is connected to the processor 1510, upconverts a baseband signal to an RF signal or downconverts an RF signal to a baseband signal. For this purpose, the RF module 1530 performs digital-to-analog conversion, amplification, filtering, and frequency upconversion or performs these processes reversely. The display module 1540 is connected to the processor 1510 and displays various types of information. The display module 1540 may be configured as, not limited to, a known component such as a Liquid Crystal Display (LCD), a Light Emitting Diode (LED) display, and an Organic Light Emitting Diode (OLED) display. The UI module 1550 is connected to the processor 1510 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method of transmitting a synchronization signal in a wireless communication system and an apparatus therefor are described centering on the example applied to $5^{th}$ generation NewRAT system, the method and the apparatus can be applied not only to the $5^{th}$ generation NewRAT system but also to various wireless communication systems.

What is claimed is:

1. A method of transmitting a synchronization signal block (SSB) by a base station in a wireless communication system, the method comprising:
    mapping the SSB to both a first group of 4 consecutive orthogonal frequency division multiplexed (OFDM) symbols and a second group of 4 consecutive OFDM symbols within a transmission interval having a duration of 14 OFDM symbols, with the first group of 4 consecutive OFDM symbols arranged within an initial 7 OFDM symbols of the transmission interval, and the second group of 4 consecutive OFDM symbols arranged within a last 7 OFDM symbols of the transmission interval; and
    transmitting, to a user equipment (UE), the SSB mapped to both the first group of 4 consecutive OFDM symbols and the second group of 4 consecutive OFDM symbols within the transmission interval,
    wherein the initial 7 OFDM symbols and the last 7 OFDM symbols of the transmission interval each includes a single group of 4 consecutive OFDM symbols to which the SSB is mapped, and
    wherein the SSB comprises a physical broadcast channel (PBCH), a primary synchronization signal (PSS), and a secondary synchronization signal (SSS).

2. The method of claim 1, wherein the first group of 4 consecutive OFDM symbols is arranged after an initial 2 OFDM symbols of the transmission interval, and
    wherein the second group of 4 consecutive OFDM symbols is arranged before a last 2 OFDM symbols of the transmission interval.

3. The method of claim 1, wherein for a plurality of transmission intervals, each of the plurality of transmission intervals comprises a respective first group of 4 consecutive OFDM symbols and a respective second group of 4 consecutive OFDM symbols that are arranged within the each of the plurality of transmission intervals at same relative positions within the each of the plurality of transmission intervals.

4. The method of claim 1, wherein the transmission interval is a subframe having a duration of 1 ms.

5. The method of claim 1, wherein the SSB is mapped to both the first group of 4 consecutive OFDM symbols and the second group of 4 consecutive OFDM symbols so as not to overlap a boundary between the initial 7 OFDM symbols and the last 7 OFDM symbols of the transmission interval.

6. A base station configured to transmit a synchronization signal block (SSB) in a wireless communication system, the base station comprising:
    at least one radio-frequency (RF) module;
    at least one processor; and at least one computer memory operably connectable to the at least one processor and storing instructions that, when executed by the at least one processor, perform operations comprising:

mapping the SSB to both a first group of 4 consecutive orthogonal frequency division multiplexed (OFDM) symbols and a second group of 4 consecutive OFDM symbols within a transmission interval having a duration of 14 OFDM symbols, with the first group of 4 consecutive OFDM symbols arranged within an initial 7 OFDM symbols of the transmission interval, and the second group of 4 consecutive OFDM symbols arranged within a last 7 OFDM symbols of the transmission interval; and transmitting, to a user equipment (UE) through the at least one RF module, the SSB mapped to both the first group of 4 consecutive OFDM symbols and the second group of 4 consecutive OFDM symbols within the transmission interval, wherein the initial 7 OFDM symbols and the last 7 OFDM symbols of the transmission interval each includes a single group of 4 consecutive OFDM symbols to which the SSB is mapped, and wherein the SSB comprises a physical broadcast channel (PBCH), a primary synchronization signal (PSS), and a secondary synchronization signal (SSS).

7. The base station of claim 6, wherein the first group of 4 consecutive OFDM symbols is arranged after an initial 2 OFDM symbols of the transmission interval, and wherein the second group of 4 consecutive OFDM symbols is arranged before a last 2 OFDM symbols of the transmission interval.

8. The base station of claim 6, wherein for a plurality of transmission intervals, each of the plurality of transmission intervals comprises a respective first group of 4 consecutive OFDM symbols and a respective second group of 4 consecutive OFDM symbols that are arranged within the each of the plurality of transmission intervals at same relative positions within the each of the plurality of transmission intervals.

9. The base station of claim 6, wherein the transmission interval is a subframe having a duration of 1 ms.

10. The base station of claim 6, wherein the SSB is mapped to both the first group of 4 consecutive OFDM symbols and the second group of 4 consecutive OFDM symbols so as not to overlap a boundary between the initial 7 OFDM symbols and the last 7 OFDM symbols of the transmission interval.

11. At least one non-transitory tangible computer-readable storage medium storing computer instructions that, when executed by at least one processor, control a communication device to perform operations of transmitting a synchronization signal block (SSB) in a wireless communication system, the operations comprising:

mapping the SSB to both a first group of 4 consecutive orthogonal frequency division multiplexed (OFDM) symbols and a second group of 4 consecutive OFDM symbols within a transmission interval having a duration of 14 OFDM symbols, with the first group of 4 consecutive OFDM symbols arranged within an initial 7 OFDM symbols of the transmission interval, and the second group of 4 consecutive OFDM symbols arranged within a last 7 OFDM symbols of the transmission interval; and transmitting, to a user equipment (UE), the SSB mapped to both the first group of 4 consecutive OFDM symbols and the second group of 4 consecutive OFDM symbols within the transmission interval, wherein the initial 7 OFDM symbols and the last 7 OFDM symbols of the transmission interval each includes a single group of 4 consecutive OFDM symbols to which the SSB is mapped, and wherein the SSB comprises a physical broadcast channel (PBCH), a primary synchronization signal (PSS), and a secondary synchronization signal (SSS).

12. The non-transitory tangible computer-readable storage medium of claim 11, wherein the first group of 4 consecutive OFDM symbols is arranged after an initial 2 OFDM symbols of the transmission interval, and wherein the second group of 4 consecutive OFDM symbols is arranged before a last 2 OFDM symbols of the transmission interval.

13. The non-transitory tangible computer-readable storage medium of claim 11, wherein for a plurality of transmission intervals, each of the plurality of transmission intervals comprises a respective first group of 4 consecutive OFDM symbols and a respective second group of 4 consecutive OFDM symbols that are arranged within the each of the plurality of transmission intervals at same relative positions within the each of the plurality of transmission intervals.

14. The non-transitory tangible computer-readable storage medium of claim 11, wherein the transmission interval is a subframe having a duration of 1 ms.

15. The non-transitory tangible computer-readable storage medium of claim 11, wherein the SSB is mapped to both the first group of 4 consecutive OFDM symbols and the second group of 4 consecutive OFDM symbols so as not to overlap a boundary between the initial 7 OFDM symbols and the last 7 OFDM symbols of the transmission interval.

* * * * *